(12) United States Patent
Zhang (10) Patent No.: US 11,048,155 B2
(45) Date of Patent: Jun. 29, 2021

(54) DIFFRACTIVE OPTICAL ASSEMBLY, LASER PROJECTION UNIT, AND DEPTH CAMERA

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/367,552

(22) Filed: Mar. 28, 2019

(65) Prior Publication Data
US 2019/0310541 A1  Oct. 10, 2019

(30) Foreign Application Priority Data

Apr. 4, 2018 (CN) .......................... 201810294924.5

(51) Int. Cl.
*G03B 21/20* (2006.01)
*G02B 7/02* (2006.01)
(Continued)

(52) U.S. Cl.
CPC ...... *G03B 21/2033* (2013.01); *G01B 11/2513* (2013.01); *G02B 5/1842* (2013.01);
(Continued)

(58) Field of Classification Search
CPC ... G03B 21/2033; G06T 7/50; G01B 11/2513; G02B 5/1842; G02B 7/02;
(Continued)

(56) References Cited

U.S. PATENT DOCUMENTS 6,523,963 B2 2/2003 Nakabayashi
8,027,089 B2 * 9/2011 Hayashi ............... G02B 5/1819
359/566
(Continued)

FOREIGN PATENT DOCUMENTS

CN 102109626 6/2011
CN 104076423 10/2014
(Continued)

OTHER PUBLICATIONS

CNIPA, Office Action for CN Appl. No. 201810294924.5, dated Jun. 6, 2019.
(Continued)

*Primary Examiner* — Michelle M Iacoletti
*Assistant Examiner* — Magda Cruz
(74) *Attorney, Agent, or Firm* — Hodgson Russ LLP (57) ABSTRACT

Disclosed are a diffractive optical assembly, a laser projection unit, and a depth camera. The diffractive optical assembly includes a sealing assembly and a diffractive optical element. The sealing assembly includes a light transparent first sealing plate, a light transparent second sealing plate, and a spacer. The first sealing plate and the second sealing plate are arranged opposite to each other. The spacers spaces the first sealing plate and the second sealing plate apart. The first sealing plate, the second sealing plate and the spacer cooperatively defines a closed receiving cavity. The diffractive optical element is accommodated in the receiving cavity. The diffractive optical element includes a light transparent diffractive body and a diffractive structure formed on the diffractive body.

20 Claims, 8 Drawing Sheets

(51) Int. Cl.
  *G02B 27/09* (2006.01)
  *G02B 27/30* (2006.01)
  *G02B 27/42* (2006.01)
  *G02B 27/00* (2006.01)
  *G02B 27/20* (2006.01)
  *G02B 5/18* (2006.01)
  *G06T 7/50* (2017.01)
  *G01B 11/25* (2006.01)

(52) U.S. Cl.
  CPC .......... *G02B 7/02* (2013.01); *G02B 27/0006* (2013.01); *G02B 27/0944* (2013.01); *G02B 27/20* (2013.01); *G02B 27/30* (2013.01); *G02B 27/425* (2013.01); *G02B 27/4272* (2013.01); *G02B 27/4277* (2013.01); *G06T 7/50* (2017.01)

(58) Field of Classification Search
  CPC  G02B 27/0006; G02B 27/0944; G02B 27/20; G02B 27/30; G02B 27/425; G02B 27/4272; G02B 27/4277
  See application file for complete search history.

(56) References Cited

U.S. PATENT DOCUMENTS

| | | | | |
|---|---|---|---|---|
| 9,696,469 | B2* | 7/2017 | Genda | G02B 5/1857 |
| 2001/0050815 | A1* | 12/2001 | Ishihara | H04N 9/3167 |
| | | | | 359/566 |
| 2002/0024734 | A1* | 2/2002 | Nakabayashi | G02B 7/00 |
| | | | | 359/569 |
| 2007/0295893 | A1* | 12/2007 | Olsen | H04N 5/335 |
| | | | | 250/226 |
| 2009/0180185 | A1* | 7/2009 | Hayashi | B81C 99/0085 |
| | | | | 359/566 |
| 2009/0180186 | A1* | 7/2009 | Ando | G02B 1/105 |
| | | | | 359/566 |
| 2016/0178915 | A1 | 6/2016 | Mor et al. | |
| 2016/0197452 | A1 | 7/2016 | Mor | |
| 2016/0238855 | A1 | 8/2016 | Kriman et al. | |
| 2018/0101016 | A1* | 4/2018 | Enzmann | G02B 3/0068 |

FOREIGN PATENT DOCUMENTS

| | | | | |
|---|---|---|---|---|
| CN | 204269928 | | 4/2015 | |
| CN | 204271438 | | 4/2015 | |
| CN | 204790289 | | 11/2015 | |
| CN | 205002744 | | 1/2016 | |
| CN | 105372905 | | 3/2016 | |
| CN | 105929558 | | 9/2016 | |
| CN | 107257938 | | 10/2017 | |
| CN | 107703641 | | 2/2018 | |
| CN | 107741682 | | 2/2018 | |
| CN | 207133560 | | 3/2018 | |
| CN | 108535828 | | 9/2018 | |
| CN | 108535828 | A * | 9/2018 | ............. G02B 27/42 |
| CN | 108594393 | | 9/2018 | |
| DE | 102016116747 | | 3/2018 | |
| JP | 2006171298 | | 6/2006 | |
| WO | 2007119681 | | 10/2007 | |

OTHER PUBLICATIONS

WIPO, ISR for International Appl. No. PCT/CN2019/070679, dated Apr. 8, 2019.

EPO, Office Action for EP Application No. 19167144.5, dated Aug. 8, 2019.

SIPO, Second Office Action for CN Application No. 201810294924.5, dated Aug. 26, 2019.

TIPO, Office Action for TW Application No. 108110091, dated Sep. 12, 2019.

IPI, Office Action for IN Application No. 201914013235, dated Dec. 21, 2020.

* cited by examiner

DIFFRACTIVE OPTICAL ASSEMBLY, LASER PROJECTION UNIT, AND DEPTH CAMERA

CROSS-REFERENCE TO RELATED APPLICATION

This application claims priority to Chinese Patent Application No. 201810294924.5, filed Apr. 4, 2018, the entire disclosure of which is incorporated herein by reference.

FIELD

The present disclosure relates to a field of imaging technology, and more particularly to a diffractive optical assembly, a laser projection unit, and a depth camera.

BACKGROUND

A laser projection unit includes a light source, a collimating element and a diffractive optical element (DOE). A face of the diffractive optical element is usually a very fine diffractive face.

SUMMARY

Embodiments of the present disclosure provide a diffractive optical assembly, a laser projection unit, a depth camera and an electronic device.

The diffractive optical assembly according to embodiments of the present disclosure includes a sealing assembly and a diffractive optical element. The sealing assembly includes a first sealing plate, a second sealing plate, and a spacer, and the first sealing plate and the second sealing plate are light transparent. The first sealing plate and the second sealing plate are arranged opposite to each other. The spacer spaces the first sealing plate and the second sealing plate apart. The first sealing plate, the second sealing plate, and the spacer cooperatively define a closed receiving cavity. The diffractive optical element is accommodated in the receiving cavity. The diffractive optical element includes a light-transparent diffractive body and a diffractive structure formed on the diffractive body.

The laser projection unit according to embodiments of the present disclosure includes a substrate assembly 10, a lens barrel assembly, a light source, a collimating element and the diffractive optical assembly according to the above-mentioned embodiments. The lens barrel assembly is provided to the substrate assembly and defines an accommodating cavity together with the substrate assembly. The light source is provided to the substrate assembly and received in the accommodating cavity. The collimating element is accommodated in the accommodating cavity. The diffractive optical assembly is accommodated in the accommodating cavity. The collimating element, the first sealing plate, the diffractive optical element and the second sealing plate are arranged in an optical path of the light source sequentially.

The depth camera according to embodiments of the present disclosure includes the laser projection unit according to the above-mentioned embodiments, an image acquirer and a processor. The image acquirer is configured to acquire a laser pattern projected to a target space after passing through the diffractive optical element. The processor is connected to the laser projection unit and the image acquirer separately, and is configured to process the laser pattern so as to obtain a depth image.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

The embodiments of the present disclosure are illustrated further below in combination of the accompanying drawings, in which the same or similar reference numerals are used to refer to the same or similar elements or elements having the same or similar functions.

The embodiments described below with reference to the accompanying drawings are illustrative and only intended to explain the present application, and are not to be construed as limit the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 5:
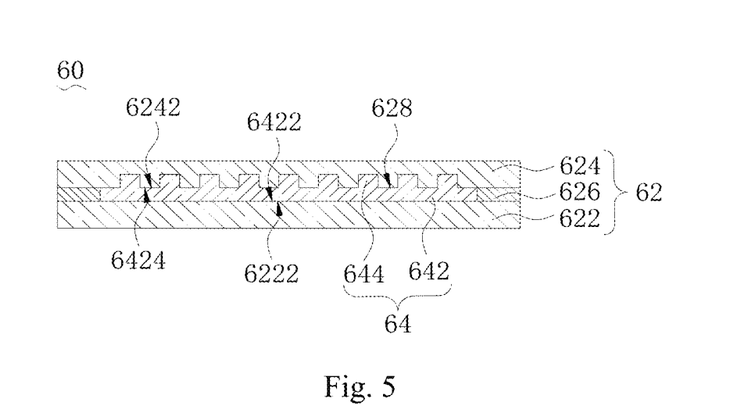
FIG. 5 to FIG. 16 are schematic views of a diffractive optical assembly according to some embodiments of the present disclosure.

As illustrated in FIG. 5, a diffractive optical assembly 60 according to embodiments of the present disclosure includes a sealing assembly 62 and a diffractive optical element 64. The sealing assembly 62 includes a first sealing plate 622, a second sealing plate 624, and a spacer 626. The first sealing plate 622 and the second sealing plate 624 are light transparent. The first sealing plate 622 and the second sealing plate 624 are arranged opposite to each other. The spacer 626 spaces the first sealing plate 622 and the second sealing plate 624 apart. The first sealing plate 622, the second sealing plate 624, and the spacer 626 cooperatively define a closed receiving cavity 628. The diffractive optical element 64 is accommodated in the receiving cavity 628. The diffractive optical element 64 includes a light-transparent diffractive body 642 and a plurality of diffractive structures 644 formed on the diffractive body 642.

Figure 8:
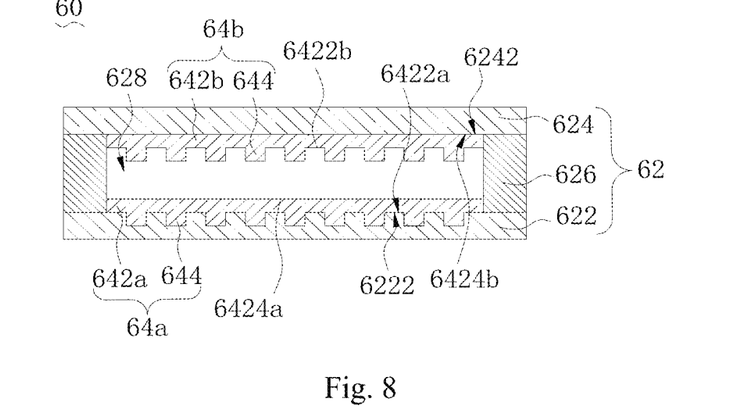

As illustrated in FIG. 5 and FIG. 8, in some embodiments, the first sealing plate 622 includes a first abutment face 6222 opposite to the second sealing plate 624, and the second sealing plate 624 includes a second abutment face 6242 opposite to the first sealing plate 622. One diffractive optical element 64 is provided and the one diffractive optical element 64 abuts against the first abutment face 6222 and the second abutment face 6242. Or, at least two diffractive optical elements 64 are provided, and two diffractive optical elements 64 of the at least two diffractive optical elements 64 abut against the first abutment face 6222 and the second abutment face 6242 correspondingly.

Figure 10:
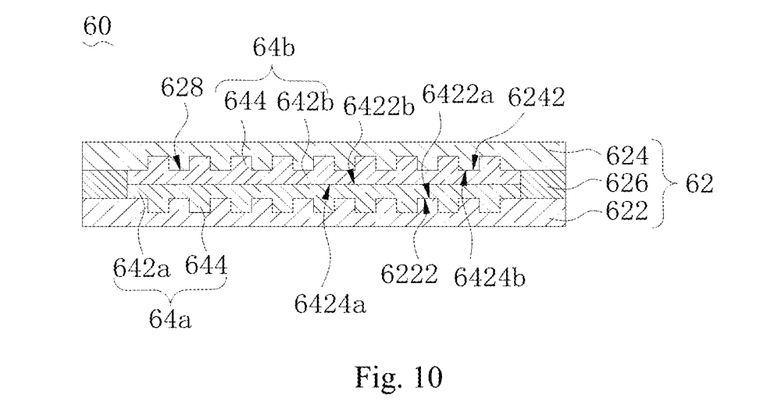

As illustrated in FIG. 8 and FIG. 10, in some embodiments, at least two diffractive optical elements 64 are provided, and two adjacent diffractive optical elements 64 abut against each other, or two adjacent diffractive optical elements 64 are spaced apart from each other.

Figure 16:
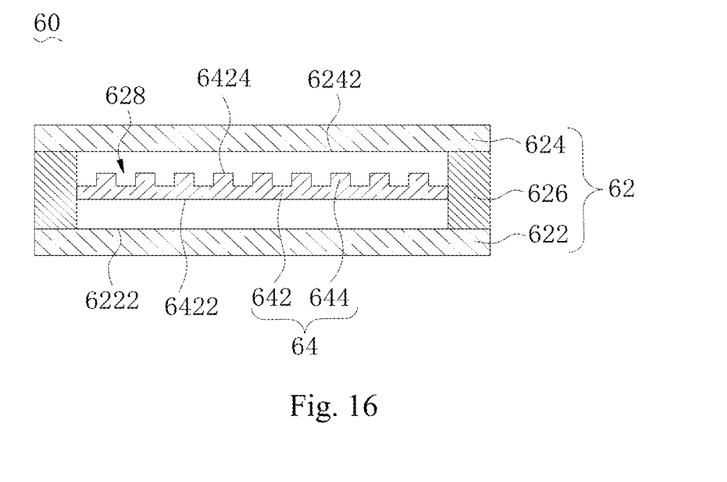

As illustrated in FIG. 16, in some embodiments, one or at least two diffractive optical elements 64 are provided, the one or at least two diffractive optical elements 64 are spaced apart from the first abutment face 6222 and the second abutment face 6242.

As illustrated in FIG. 16, in some embodiments, the one diffractive optical element 64 or each of the at least two diffractive elements 64 is mounted to the spacer 626 through a side wall of the diffractive body 642.

As illustrated in FIG. 5 and FIG. 8, in some embodiments, one diffractive optical element 64 is provided, and the diffractive body 642 includes a diffraction incident face and a diffraction emission face 6424 opposite to each other, and the diffractive structure 644 is formed on the diffraction incident face 6422 or/and the diffraction emission face 6424; or, at least two diffractive optical elements 64 are provided, the diffractive body 642 of each diffractive optical element 64 includes the diffraction incident face 6422 and the diffraction emission face 6424 opposite to each other, and the diffractive structure 644 of each diffractive optical element 64 is formed on the corresponding diffraction incident face 6422 or/and the diffraction emission face 6424.

As illustrated in FIGS. 8 to 15, in some embodiments, the spacer 626 and the diffractive body 642 are spaced apart from each other; or the spacer 626 abuts against the diffractive body 642.

Figure 1:
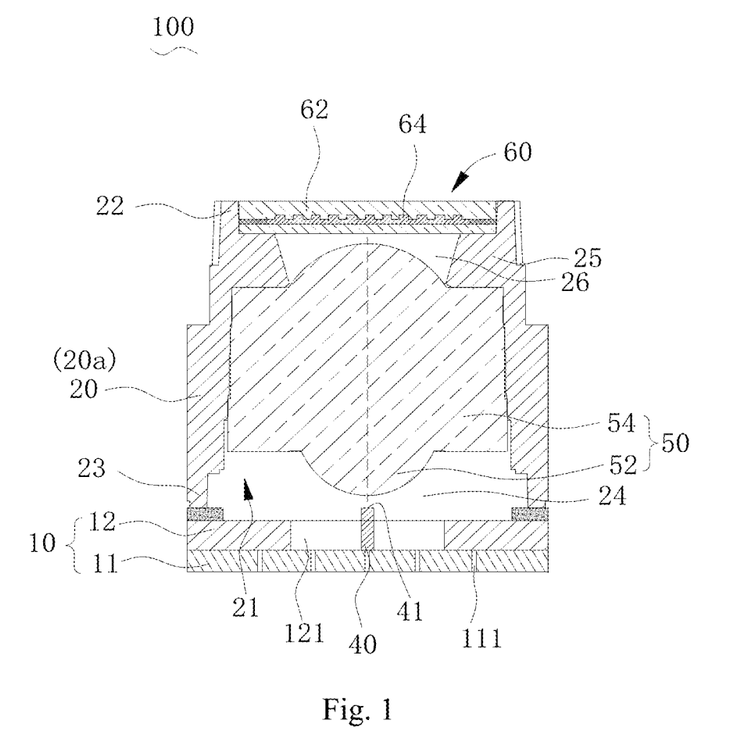
FIG. 1 is a schematic view of a laser projection unit according to some embodiments of the present disclosure.

As illustrated in FIG. 1, a laser projection unit 100 according to embodiments of the present disclosure includes a substrate assembly 10, a lens barrel assembly 20, a light source 40, a collimating element 50 and the diffractive optical assembly 60. The lens barrel assembly 20 is provided to the substrate assembly 10 and defines an accommodating cavity 21 together with the substrate assembly 10. The light source 40 is provided to the substrate assembly 10 and received in the accommodating cavity 21. The collimating element 50 is accommodated in the accommodating cavity 21. The diffractive optical assembly 60 is accommodated in the accommodating cavity 21. The collimating element 50, the first sealing plate 622, the diffractive optical element 64 and the second sealing plate 624 are arranged in an optical path of the light source 40 sequentially.

Figure 2:
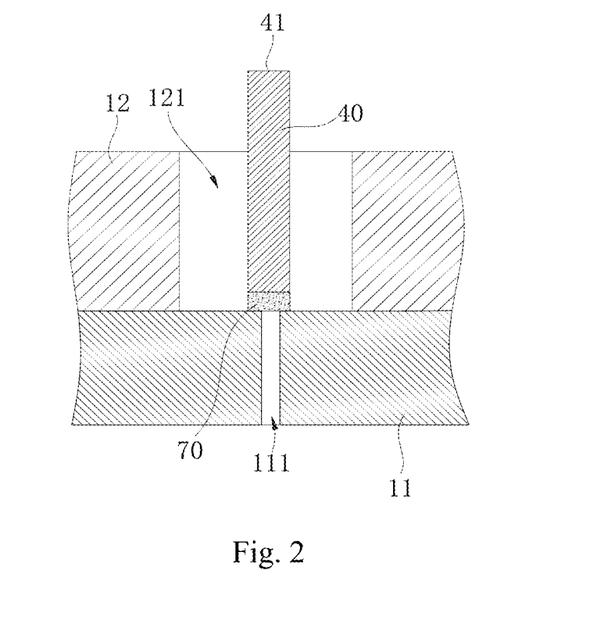
FIG. 2 to FIG. 4 are partial schematic views of a laser projection unit according to some embodiments of the present disclosure.

As illustrated in FIG. 1 and FIG. 2, in some embodiments, the light source 40 is an edge-emitting laser. The light source 40 includes a light emitting face 41, and the light emitting face 41 faces the collimating element 50.

As illustrated in FIG. 1, in some embodiments, the light emitting face 41 is perpendicular to a collimating light axis of the collimating element 50.

As illustrated in FIG. 1, in some embodiments, the edge-emitting laser is a distributed feedback laser.

As illustrated in FIG. 1, in some embodiments, the light source 40 is a vertical cavity surface emitting laser.

As illustrated in FIG. 1, in some embodiments, the lens barrel assembly 20 includes a lens barrel 20a. The lens barrel 20a includes a top portion 22 and a bottom portion 23 opposite to each other. The lens barrel 20a defines a through hole 24 running through the top portion 22 and the bottom portion 23. The bottom portion 23 is supported on the substrate assembly 10. An annular supporting stage 25 extends from an inner wall of the lens barrel 20a towards a center of the through hole 24. The diffractive optical assembly 60 is supported on the supporting stage 25.

As illustrated in FIGS. 1 and 5, in some embodiments, a side wall of the first sealing plate 622, a side wall of the second sealing plate 624, and a side wall of the spacer 626 each are bonded to an inner wall of the top portion 22 in the adhesive method.

As illustrated in FIG. 1, in some embodiments, the substrate assembly 10 includes a circuit board 12, and the light source 40 and the lens barrel assembly 20 are provided to the circuit board 12.

As illustrated in FIG. 1, in some embodiments, the substrate assembly 10 includes a substrate 11 and the circuit board 12 supported on the substrate 11. The circuit board 12 defines a via hole 121, and the light source 40 is supported on the substrate 11 and accommodated in the via hole 121.

As illustrated in FIG. 1, in some embodiments, the substrate 11 is provided with a heat-dissipation hole 111.

As illustrated in FIG. 1, in some embodiments, the collimating element 50 includes one or a plurality of lens, and the one or the plurality of lens is provided in the optical path of the light source 40.

As illustrated in FIG. 1, in some embodiments, the lens is made of glass material; or the lens is made of plastic material.

Figure 17:
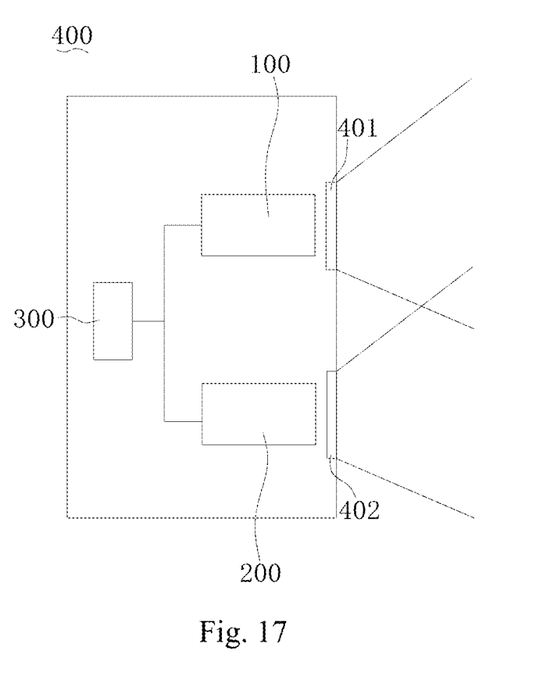
FIG. 17 is a schematic view of a depth camera according to some embodiments of the present disclosure.

As illustrated in FIG. 17, a depth camera 400 according to embodiments of the present disclosure includes the laser projection unit 100, an image acquirer 200 and a processor 300. The image acquirer 200 is configured to acquire a laser pattern projected to a target space after passing through the diffractive optical element 64. The processor 300 is connected to the laser projection unit 100 and the image acquirer 200 separately, and is configured to process the laser pattern so as to obtain a depth image.

Figure 18:
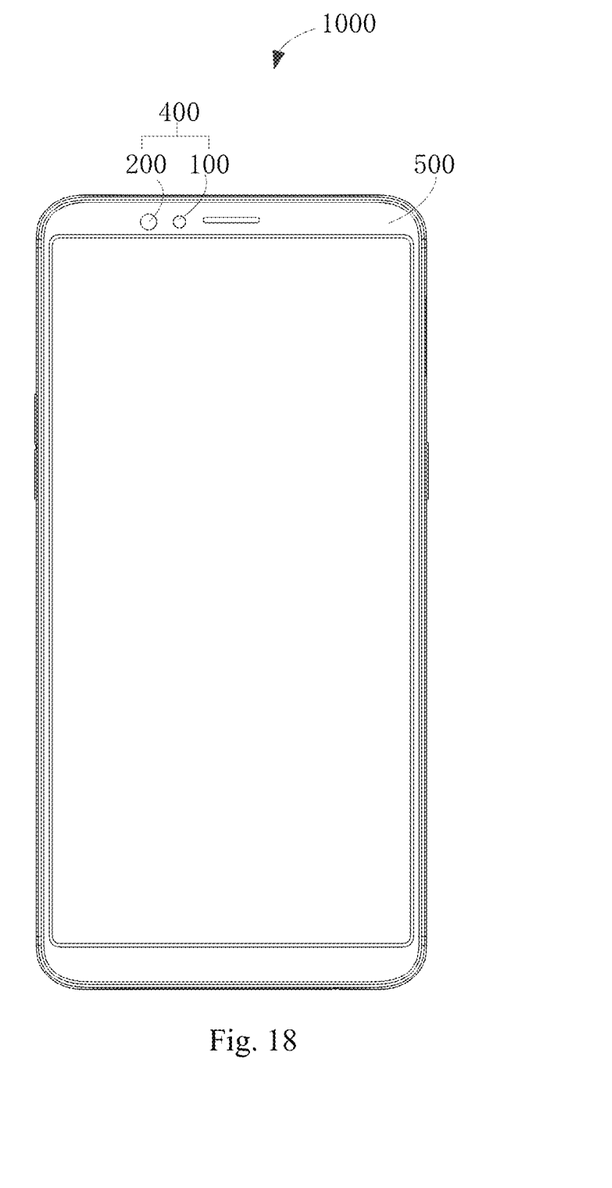
FIG. 18 is a schematic view of an electronic device according to some embodiments of the present disclosure.

As illustrated in FIG. 18, an electronic device 1000 according to embodiments of the present disclosure includes a housing 500 and the depth camera 400. The depth camera 400 is provided to the housing 500 and exposed from the housing 500 so as to obtain the depth image.

As illustrated in FIG. 1, the laser projection unit 100 according to embodiments of the present disclosure includes the substrate assembly 10, the lens barrel assembly 20, the light source 40, the collimating element 50 and the diffractive optical assembly 60. The lens barrel assembly 20 is provided to the substrate assembly 10 and defines the accommodating cavity 21 together with the substrate assembly 10. The light source 40, the collimating element 50, and the diffractive optical assembly 60 are all accommodated in the accommodating cavity 21. The light source 40 is provided to the substrate assembly 10, and the collimating element 50 and the diffractive optical assembly 60 are arranged in the optical path of the light source 40 sequentially.

The substrate assembly 10 includes the substrate 11 and the circuit board 12 supported on the substrate 11. The substrate 11 can be made of plastic, such as any one or more of polyethylene glycol terephthalate (PET), polymethyl methacrylate (PMMA), polycarbonate (PC), and polyimide (PI). Thus, the substrate 11 has a less weight and enough supporting strength. The circuit board 12 can be a rigid board, a flexible board, or a rigid-flex board. The circuit board 12 is provided with the via hole 121. The light source 40 is fixed to the substrate 11 through the via hole 121 and electrically connected with the circuit board 12. The substrate 11 can be provided with the heat-dissipation hole 111, and heat generated by operations of the light source 40 or the circuit board 12 can be dissipated out through the heat-dissipation hole 111. The heat-dissipation hole 111 can also be filled with heat-conducting adhesive so as to further improve heat dissipation performance of the substrate assembly 10.

The lens barrel assembly 20 includes the lens barrel 20a, and the lens barrel 20a includes the top portion 22 and the bottom portion 23 opposite to each other. The lens barrel 20a defines a through hole 24 running through the top portion 22 and the bottom portion 23. The bottom portion 23 is supported on the substrate assembly 10, and specifically, can be fixed to the circuit board 12 by means of adhesive or be fixed to the circuit board 12 through methods such as snap engagement, welding, or threaded connection. The supporting stage 25 extends from the inner wall of the lens barrel 20a towards the center of the through hole 24. The diffractive optical assembly 60 is supported on the supporting stage 25. The supporting stage 25 defines a light through hole 26 communicated with the accommodating cavity 21.

Figure 3:
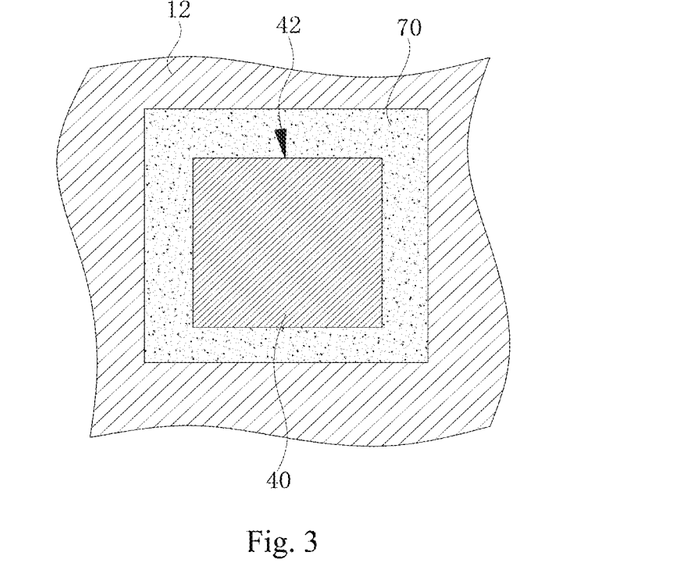

The light source 40 is configured to emit laser. The light source 40 can be the vertical cavity surface emitting laser (VCSEL) or the edge-emitting laser (EEL). In the embodiments illustrated in FIG. 1, the light source 40 is the edge-emitting laser. Specifically, the light source 40 can be the distributed feedback laser (DFB). The light source 40 is configured to emit laser towards an interior of the accommodating cavity 21. In combination with FIG. 2, the light source 40 has a columnar shape as a whole, and an end face of the light source 40 away from the substrate assembly 10 forms the light emitting face 41, the laser is emitted from the light emitting face 41, the light emitting face 41 faces the collimating element 50 and is perpendicular to the collimating light axis of the collimating element 50, and the collimating light axis passes through a center of the light emitting face 41. The light source 40 is fixed to the substrate assembly 10. Specifically, the light source 40 can be adhered to the substrate assembly 10 by means of sealing adhesive 70. For example, a face of the light source 40 opposite to the light emitting face 41 is adhered to the substrate assembly 10. In combination with FIG. 1 and FIG. 3, a side face 42 of the light source 40 can also adhere to the substrate assembly 10, and the sealing adhesive 70 wraps around side faces 42. It is also conceivable that only one face of the side faces 42 adheres to the substrate assembly 10 or several faces of the side faces 42 adhere to the substrate assembly 10. In this case, the sealing adhesive 70 can be the heat-conducting adhesive so as to conduct the heat generated by the operation of the light source 40 to the substrate assembly 10.

The edge-emitting laser is adopted as the light source 40 of the laser projection unit 100. On the one hand, the temperature drift of the edge-emitting laser is less than that of a VCSEL array. On the other hand, since the edge-emitting laser is a single-point light emitting structure, it is not necessary to design an array structure, the manufacturing is simple, so that the light source 40 of the laser projection unit 100 is low in cost.

When the laser of the distributed feedback laser propagates, gain of power is obtained through feedback of a grating structure. To increase the power of the distributed feedback laser, it is necessary to increase an injection current and/or increase a length of the distributed feedback laser. As the injection current increases, power consumption of the distributed feedback laser increases and severe heat generation is resulted, in order to ensure that the distributed feedback laser can work normally, it is necessary to increase the length of the distributed feedback laser, resulting in the distributed feedback laser generally having a slender strip structure. When the light emitting face 41 of the edge-emitting laser faces the collimating element 50, the edge-emitting laser is placed vertically. Since the edge-emitting laser has the slender strip structure, the edge-emitting laser is prone to accidents such as dropping, shifting or shaking. The edge-emitting laser can be secured by providing the sealing adhesive 70 so as to avoid accidents such as dropping, shifting or shaking of the edge-emitting laser.

Figure 4:
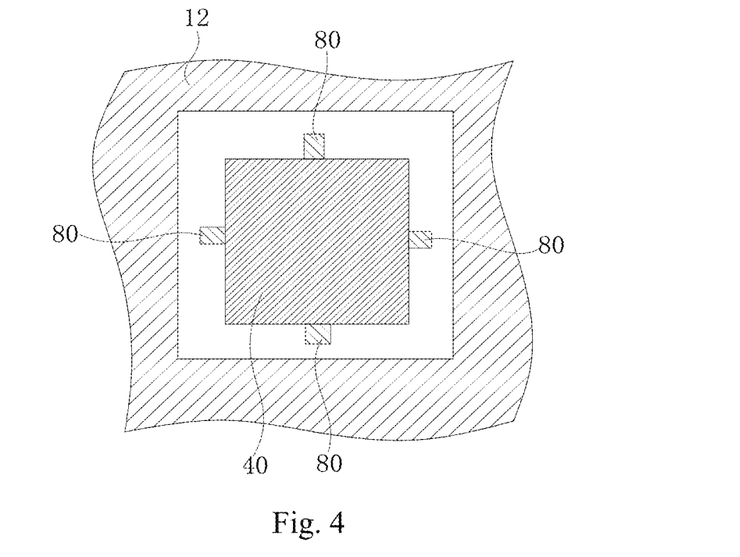

In some embodiments, the light source 40 can also be fixed to the substrate assembly 10 by a fixing method illustrated in FIG. 4. Specifically, the laser projection unit 100 includes a plurality of elastic supporting blocks 80, the supporting blocks 80 can be fixed to the substrate assembly 10, the plurality of supporting blocks 80 surround the light source 40 together, and during the installation, the light source 40 can be directly installed among the plurality of supporting blocks 80. In an example, the plurality of supporting blocks 80 clamps the light source 40 together so as to further prevent the light source 40 from shaking.

The collimating element 50 is configured to collimate the laser emitted by the light source 40. The collimating element 50 includes an optical portion 52 and a mounting portion 54 surrounding the optical portion 52. The mounting portion 54 is configured to be bonded to the inner wall of the lens barrel 20a so as to secure the collimating element 50 to the lens barrel 20a, and the supporting stage 25 is located between the collimating element 50 and the diffractive optical assembly 60. In the present embodiment, the optical portion 52 includes two curved faces located at two opposite sides of the collimating element 50. The mounting portion 54 abuts against the supporting stage 25, and one of the curved faces of the optical portion 52 extends into the light through hole 26. Thus, the supporting stage 25 can not only support the diffractive optical assembly 60, but also space the collimating element 50 and the diffractive optical assembly 60 apart, without increasing a thickness of the laser projection unit 100.

In some embodiments, the collimating element 50 can include one or a plurality of lens, and the one or the plurality of lens is coaxially arranged in the optical path of the light source 40 sequentially. The shape of each lens may be any one of an aspherical face, a spherical face, a Fresnel face, and a binary optical face. The lens can be made of glass material to solve the problem of temperature drift due to ambient temperature changes; or the lens is made of plastic material, so that the cost is lower and mass production is facilitated.

As illustrated in FIG. 1 and FIG. 5, the diffractive optical assembly 60 includes the sealing assembly 62 and the diffractive optical element 64.

The sealing assembly 62 includes the first sealing plate 622, the second sealing plate 624 and the spacer 626. The first sealing plate 622 and the second sealing plate 624 are arranged opposite to each other. The spacer 626 spaces the first sealing plate 622 and the second sealing plate 624 apart. The spacer 626 can be annular. The first sealing plate 622, the second sealing plate 624, and the spacer 626 cooperatively define the closed receiving cavity 628. The first sealing plate 622 is supported on the supporting stage 25, a bottom of the first sealing plate 622 can be bonded to the supporting stage 25 in an adhesive method, and a side wall of the first sealing plate 622, a side wall of the second sealing plate 624, and a side wall of the spacer 626 each can also be bonded to an inner wall of the top portion 22 in the adhesive method. The first sealing plate 622 and the second sealing plate 624 can be made of light transparent material, such as glass, polymethyl methacrylate (PMMA), polycarbonate (PC), polyimide (PI) and the like. As the light transparent materials such as the glass, PMMA, PC, and PI all have great light transmitting performance, the normal operation of the laser projection unit 100 is not influenced by the first sealing plate 622 and the second sealing plate 624 due to their blocking to light rays. The spacer 626 can be made of a polymeric material such as epoxy resin and polyimide, or metal, metal alloy, glass or the like.

The diffractive optical element 64 is accommodated in the receiving cavity 628, and the collimating element 50, the first sealing plate 622, the diffractive optical element 64, and the second sealing plate 624 are provided in the optical path of the light source 40 sequentially. The diffractive optical element 64 is configured to diffract the laser collimated by the collimating element 50 so as to form the laser pattern. The first sealing plate 622 includes the first abutment face 6222 opposite to the second sealing plate 624, and the second sealing plate 624 includes the second abutment face 6242 opposite to the first sealing plate 622. The diffractive optical element 64 is located between the first abutment face 6222 and the second abutment face 6242. The diffractive optical element 64 includes the light transparent diffractive body 642 and the plurality of the diffractive structure 644 formed on the diffractive body 642. The diffractive optical element 64 can be made of glass or composite plastic such as PET. The diffractive structure 644 can be formed on the diffractive body 642 by etching, nanoimprinting, or the like. The diffractive structure 644 faces the light source 40 or the collimating element 50.

It can be understood that a face of the diffractive optical element is usually a very fine diffractive face. However, during the production or use of the laser projection unit, moisture or other contaminants may adhere to the face of the diffractive optical element, so that the diffraction efficiency of the diffractive optical element is reduced, and even the diffractive optical element is caused to diffract light beams in a direction other than expected, burning the user's eyes. In the embodiments of the present disclosure, the diffractive optical element 64 is housed in the enclosed receiving cavity 628, which can protect the diffractive optical element 64 from being damaged by moisture or other contaminants. In addition, the well-sealed diffractive optical assembly 60 enables the laser projection unit 100 to be used in high moisture and/or airborne particulate environments without damaging the user's eyes or reducing the optical performance of the laser projection unit 100.

During the manufacturing of the diffractive optical assembly 60, the diffractive optical element 64 can be provided to the first sealing plate 622 first, then the spacer 626 is provided to the first sealing plate 622 and rendered to surround the diffractive optical element 64, and then the second sealing plate 624 is provided to the spacer 626 so as to realize the sealing of the diffractive optical element 64. Or, the diffractive optical element 64 is provided to the second sealing plate 624 first, then the spacer 626 is provided to the second sealing plate 624 and rendered to surround the diffractive optical element 64, and then the first sealing plate 622 is provided to the spacer 626 so as to realize the sealing of the diffractive optical element 64.

Figure 6:
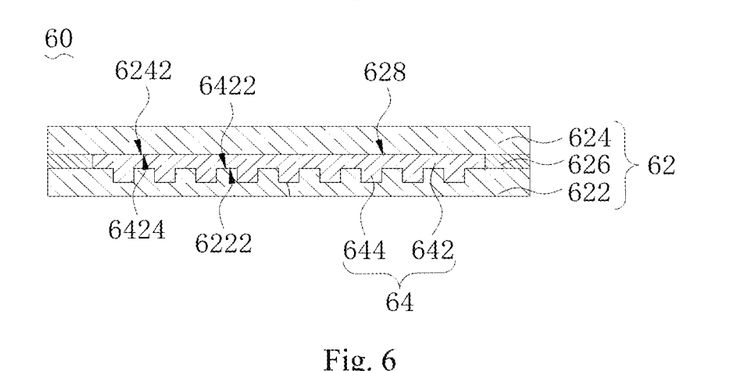
Figure 7:
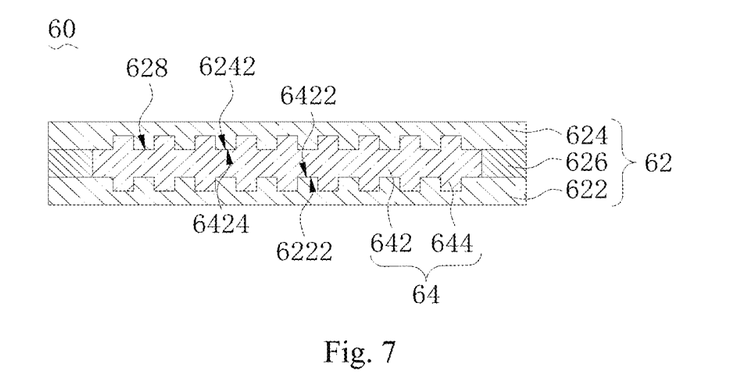

As illustrated in FIG. 5 to FIG. 7, one diffractive optical element 64 can be provided. The diffractive body 642 includes the diffraction incident face 6422 and the diffraction emission face 6424 opposite to each other. The diffractive optical element 64 abuts against the first abutment face 6222 and the second abutment face 6242. Specifically, the diffraction incident face 6422 abuts against the first abutment face 6222, and the diffraction emission face 6424 abuts against the second abutment face 6242.

Further, as illustrated in FIG. 5, in some embodiments, the diffractive structure 644 is formed on the diffraction emission face 6424. The second abutment face 6242 is formed with a rugged structure engaged with the diffractive structure 644 such that the second sealing plate 624 is in close contact with the diffractive optical element 64. The first abutment face 6222 and the diffraction incident face 6422 can be bonded through optical adhesive. In this case, no gap exists between the diffractive optical element 64 and the first sealing plate 622, and no gap exists between the diffractive optical element 64 and the second sealing plate 624, either.

As illustrated in FIG. 6, in some embodiments, the diffractive structure 644 can be formed on the diffraction incident face 6422. The first abutment face 6222 is formed with the rugged structure engaged with the diffractive structure 644 such that the first sealing plate 622 is in close contact with the diffractive optical element 64. The second abutment face 6242 and the diffraction emission face 6424 can be bonded through optical adhesive. In this case, no gap exists between the diffractive optical element 64 and the first sealing plate 622, and no gap exists between the diffractive optical element 64 and the second sealing plate 624, either.

As illustrated in FIG. 7, in some embodiments, the diffractive structure 644 can be formed on the diffraction incident face 6422 and the diffraction emission face 6424. The first abutment face 6222 is formed with the rugged structure engaged with the diffractive structure 644 of the diffraction incident face 6422 such that the first sealing plate 622 is in close contact with the diffractive optical element 64. The second abutment face 6242 is formed with the rugged structure engaged with the diffractive structure 644 of the diffraction emission face 6424 such that the second sealing plate 624 is in close contact with the diffractive optical element 64. In this case, no gap exists between the diffractive optical element 64 and the first sealing plate 622, and no gap exists between the diffractive optical element 64 and the second sealing plate 624, either.

As illustrated in FIG. 8 to FIG. 15, at least two diffractive optical elements 64 are provided, such as three, four, six, eight, etc. The diffractive body 642 of each the diffractive optical element 64 includes the diffraction incident face 6422 and the diffraction emission face 6424 opposite to each other. Two diffractive optical elements 64 of at least two diffractive optical elements 64 abut against the first abutment face 6222 and the second abutment face 6242 correspondingly. In the following, the case where two diffractive optical elements 64 are provided is taken as an example for illustration, the diffractive optical element 64 includes a first diffractive optical element 64a and a second diffractive optical element 64b. The collimating element 50, the first sealing plate 622, the first diffractive optical element 64a, the second diffractive optical element 64b, and the second sealing plate 624 are arranged in the optical path of the light source 40 sequentially. The first diffractive optical element 64a includes a light-transparent first diffractive body 642a and the plurality of diffractive structures 644 formed on the first diffractive body 642a, and the second diffractive optical element 64b includes a light-transparent second diffractive body 642b and the plurality of diffractive structures 644 formed on the second diffractive body 642b. The first diffractive body 642a includes a first diffraction incident face 6422a and a first diffraction emission face 6424a opposite to each other, and the second diffractive body 642b includes a second diffraction incident face 6422b and a second diffraction emission face 6424b opposite to each other.

Further, As illustrated in FIG. 8, in some embodiments, the diffractive structure 644 of the first diffractive optical element 64a is formed on the first diffraction incident face 6422a, and the diffractive structure 644 of the second diffractive optical element 64b is formed on the second diffraction incident face 6422b. The first abutment face 6222 is formed with the rugged structure engaged with the diffractive structure 644 of the first diffraction incident face 6422a such that the first sealing plate 622 is in close contact with the first diffractive optical element 64a. The second abutment face 6242 and the second diffraction emission face 6424b may be bonded with optical adhesive. In this case, no gap exists between the first diffractive optical element 64a and the first sealing plate 622, and no gap exists between the second diffractive optical element 64b and the second sealing plate 624, either. The first diffractive optical element 64a and the second diffractive optical element 64b are spaced apart from each other.

Figure 9:
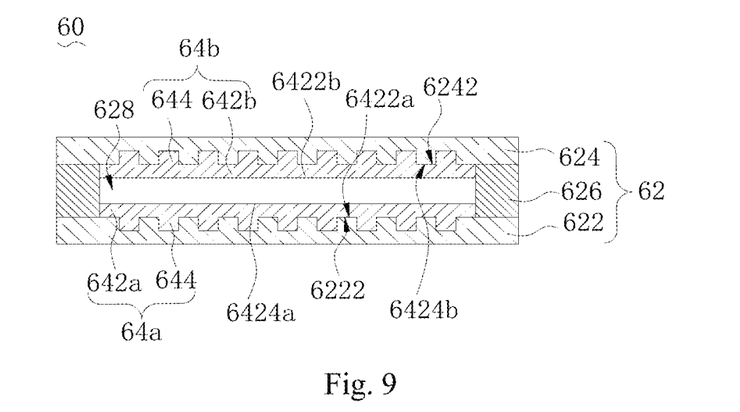

As illustrated in FIG. 9 and FIG. 10, in some embodiments, the diffractive structure 644 of the first diffractive optical element 64a is formed on the first diffraction incident face 6422a, and the diffractive structure 644 of the second diffractive optical element 64b is formed on the second diffraction emission face 6424b. The first abutment face 6222 is formed with the rugged structure engaged with the diffractive structure 644 of the first diffraction incident face 6422a such that the first sealing plate 622 is in close contact with the first diffractive optical element 64a. The second abutment face 6242 is formed with the rugged structure engaged with the diffractive structure 644 of the second diffraction emission face 6424b such that the second sealing plate 624 is in close contact with the second diffractive optical element 64b. In this case, no gap exists between the first diffractive optical element 64a and the first sealing plate 622, and no gap exists between the second diffractive optical element 64b and the second sealing plate 624, either. The first diffractive optical element 64a and the second diffractive optical element 64b can be spaced apart from each other (as illustrated in FIG. 9). Or, the first diffractive optical element 64a abuts against the second diffractive optical element 64b, specifically, the first diffraction emission face 6424a abuts against the second diffraction incident face 6422b (as illustrated in FIG. 10).

Figure 11:
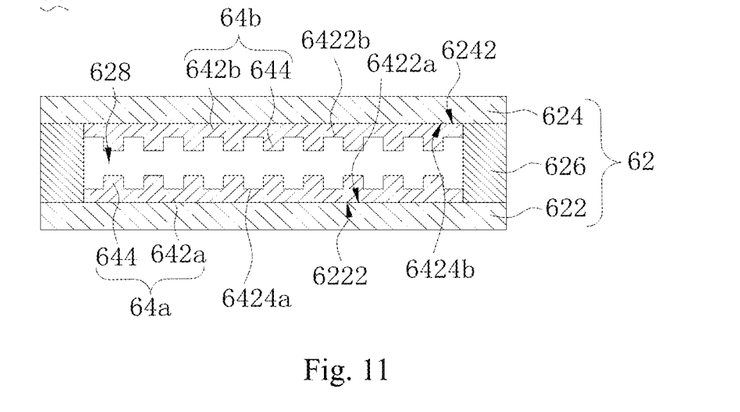
Figure 12:
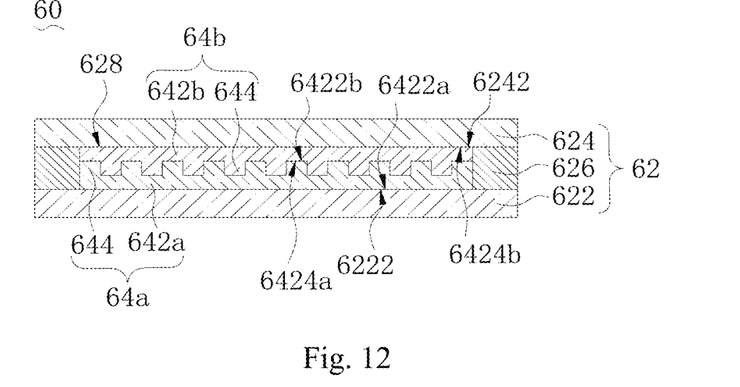

As illustrated in FIG. 11 and FIG. 12, in some embodiments, the diffractive structure 644 of the first diffractive optical element 64a is formed on the first diffraction emission face 6424a, and the diffractive structure 644 of the second diffractive optical element 64b is formed on the second diffraction incident face 6422b. The first abutment face 6222 and the first diffraction incident face 6422a can be bonded with optical adhesive, and the second abutment face 6242 and the second diffraction emission face 6424b can be bonded with optical adhesive. In this case, no gap exists between the first diffractive optical element 64a and the first sealing plate 622, and no gap exists between the second diffractive optical element 64b and the second sealing plate 624, either. The first diffractive optical element 64a and the second diffractive optical element 64b can be spaced apart from each other (as illustrated in FIG. 11). Or, the first diffractive optical element 64a abuts against the second diffractive optical element 64b, specifically, the diffractive structure 644 of the first diffraction emission face 6424a is engaged with the diffractive structure 644 of the second diffraction incident face 6422b (as illustrated in FIG. 12).

Figure 13:
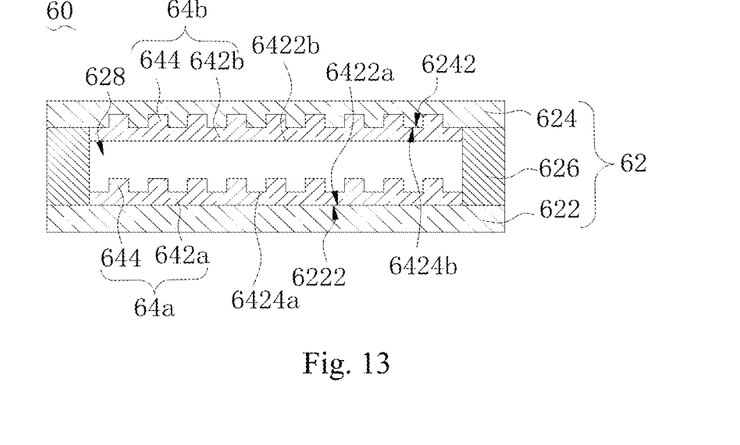

As illustrated in FIG. 13, in some embodiments, the diffractive structure 644 of the first diffractive optical element 64a is formed on the first diffraction emission face 6424a, and the diffractive structure 644 of the second diffractive optical element 64b is formed on the second diffraction incident face 6422b. The first abutment face 6222 and the first diffraction incident face 6422a can be bonded with optical adhesive. The second abutment face 6242 is formed with the rugged structure engaged with the diffractive structure 644 of the second diffraction emission face 6424b such that the second sealing plate 624 is in close contact with the second diffractive optical element 64b. In this case, no gap exists between the first diffractive optical element 64a and the first sealing plate 622, and no gap exists between the second diffractive optical element 64b and the second sealing plate 624, either. The first diffractive optical element 64a and the second diffractive optical element 64b are spaced apart from each other.

Figure 14:
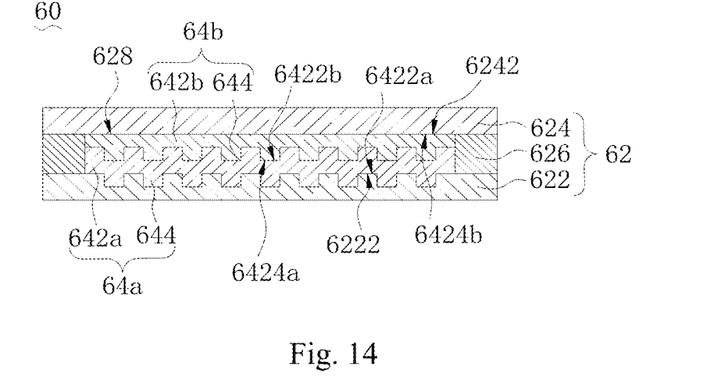

As illustrated in FIG. 14, in some embodiments, the diffractive structure 644 of the first diffractive optical element 64a is formed on the first diffraction incident face 6422a and the first diffraction emission face 6424a, and the diffractive structure 644 of the second diffractive optical element 64b is formed on the second diffraction incident face 6422b. The first abutment face 6222 is formed with the rugged structure engaged with the diffractive structure 644 of the first diffraction incident face 6422a such that the first sealing plate 622 is in close contact with the first diffractive optical element 64a. The second abutment face 6242 and the second diffraction emission face 6424b can be bonded with optical adhesive. In this case, no gap exists between the first diffractive optical element 64a and the first sealing plate 622, and no gap exists between the second diffractive optical element 64b and the second sealing plate 624, either. The first diffractive optical element 64a and the second diffractive optical element 64b can be spaced apart from each other. Or, the first diffractive optical element 64a abuts against the second diffractive optical element 64b, specifically, the diffractive structure 644 of the first diffraction emission face 6424a is engaged with the diffractive structure 644 of the second diffraction incident face 6422b (as illustrated in FIG. 14).

In some embodiments, the diffractive structure 644 of the first diffractive optical element 64a is formed on the first diffraction incident face 6422a and the first diffraction emission face 6424a, and the diffractive structure 644 of the second diffractive optical element 64b is formed on the second diffraction emission face 6424b. The first abutment face 6222 is formed with the rugged structure engaged with the diffractive structure 644 of the first diffraction incident face 6422a such that the first sealing plate 622 is in close contact with the first diffractive optical element 64a. The second abutment face 6242 is formed with the rugged structure engaged with the diffractive structure 644 of the second diffraction emission face 6424*b* such that the second sealing plate 624 is in close contact with the second diffractive optical element 64*b*. In this case, no gap exists between the first diffractive optical element 64*a* and the first sealing plate 622, and no gap exists between the second diffractive optical element 64*b* and the second sealing plate 624, either. The first diffractive optical element 64*a* and the second diffractive optical element 64*b* are spaced apart from each other.

In some embodiments, the diffractive structure 644 of the first diffractive optical element 64*a* is formed on the first diffraction incident face 6422*a*, and the diffractive structure 644 of the second diffractive optical element 64*b* is formed on the second diffraction incident face 6422*b* and the second diffraction emission face 6424*b*. The first abutment face 6222 is formed with the rugged structure engaged with the diffractive structure 644 of the first diffraction incident face 6422*a* such that the first sealing plate 622 is in close contact with the first diffractive optical element 64*a*. The second abutment face 6242 is formed with the rugged structure engaged with the diffractive structure 644 of the second diffraction emission face 6424*b* such that the second sealing plate 624 is in close contact with the second diffractive optical element 64*b*. In this case, no gap exists between the first diffractive optical element 64*a* and the first sealing plate 622, and no gap exists between the second diffractive optical element 64*b* and the second sealing plate 624, either. The first diffractive optical element 64*a* and the second diffractive optical element 64*b* are spaced apart from each other.

Figure 15:
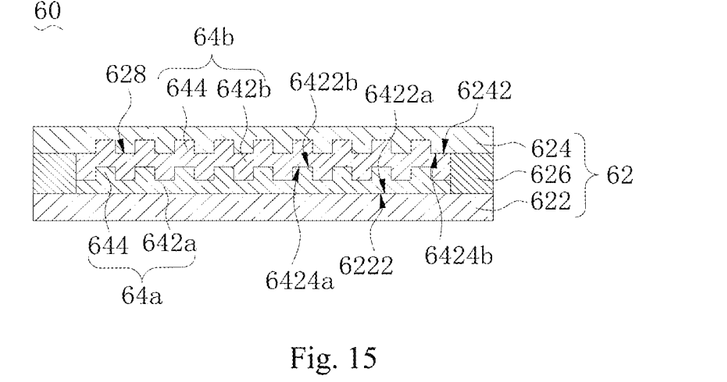

As illustrated in FIG. 15, in some embodiments, the diffractive structure 644 of the first diffractive optical element 64*a* is formed on the first diffraction emission face 6424*a*, and the diffractive structure 644 of the second diffractive optical element 64*b* is formed on the second diffraction incident face 6422*b* and the second diffraction emission face 6424*b*. The first abutment face 6222 and the first diffraction incident face 6422*a* can be bonded with optical adhesive. The second abutment face 6242 is formed with the rugged structure engaged with the diffractive structure 644 of the second diffraction emission face 6424*b* such that the second sealing plate 624 is in close contact with the second diffractive optical element 64*b*. In this case, no gap exists between the first diffractive optical element 64*a* and the first sealing plate 622, and no gap exists between the second diffractive optical element 64*b* and the second sealing plate 624, either. The first diffractive optical element 64*a* and the second diffractive optical element 64*b* can be spaced apart from each other. Or, the first diffractive optical element 64*a* abuts against the second diffractive optical element 64*b*, specifically, the diffractive structure 644 of the first diffraction emission face 6424*a* is engaged with the diffractive structure 644 of the second diffraction incident face 6422*b* (as illustrated in FIG. 15).

In some embodiments, the diffractive structure 644 of the first diffractive optical element 64*a* is formed on the first diffraction incident face 6422*a* and the first diffraction emission face 6424*a*, and the diffractive structure 644 of the second diffractive optical element 64*b* is formed on the second diffraction incident face 6422*b* and the second diffraction emission face 6424*b*. The first abutment face 6222 is formed with the rugged structure engaged with the diffractive structure 644 of the first diffraction incident face 6422*a* such that the first sealing plate 622 is in close contact with the first diffractive optical element 64*a*. The second abutment face 6242 is formed with the rugged structure engaged with the diffractive structure 644 of the second diffraction emission face 6424*b* such that the second sealing plate 624 is in close contact with the second diffractive optical element 64*b*. In this case, no gap exists between the first diffractive optical element 64*a* and the first sealing plate 622, and no gap exists between the second diffractive optical element 64*b* and the second sealing plate 624, either. The first diffractive optical element 64*a* and the second diffractive optical element 64*b* can be spaced apart from each other. Or, the first diffractive optical element 64*a* abuts against the second diffractive optical element 64*b*, specifically, the diffractive structure 644 of the first diffraction emission face 6424*a* is engaged with the diffractive structure 644 of the second diffraction incident face 6422*b*.

In the above-mentioned embodiments, the spacer 626 and the diffractive body 642 can be spaced apart from each other; or, the spacer 626 abuts against the diffractive body 642 (as illustrated in FIG. 8 to FIG. 15).

It is to be noted that when more than two diffractive optical elements 64 are provided, the structure of the diffractive optical element 64 is similar with that when two diffractive optical elements 64 are provided, which will not be described in detail here.

In other embodiments, when one or at least two diffractive optical elements 64 are provided, the diffractive optical element 64 can also be spaced apart from the first abutment face 6222 and the second abutment face 6242. That is, the diffractive optical element 64 neither abuts against the first abutment face 6222, nor abuts against the second abutment face 6242. In this case, the diffractive optical element 64 can be mounted to the spacer 626 through a side wall of the diffractive body 642 so as to be fixedly accommodated in the receiving cavity 628 (as illustrated in FIG. 16). During the manufacturing of the diffractive optical assembly 60, the diffractive optical element 64 can be mounted to the spacer 626 first so as to render the spacer 626 to surround the diffractive optical element 64, then the first sealing plate 622 and the second sealing plate 624 are provided to two opposite sides of the spacer 626 so as to realize the sealing of the diffractive optical element 64.

During the assembly of the laser projection unit 100, the collimating element 50 and the substrate assembly 10 mounted with the light source 40 are sequentially put into the through hole 24 from the bottom portion 23 of the lens barrel 20*a* along the optical path. The light source 40 can be mounted to the substrate assembly 10 first and then the substrate assembly 10 mounted with the light source 40 is fixed to the bottom portion 23. The diffractive optical assembly 60 is put into the through hole 24 from the top portion 22 against the direction of the optical path and supported on the supporting stage 25, and the first sealing plate 622 is rendered to abut against the supporting stage 25. The laser projection unit 100 has a simple structure and is convenient to assemble.

As illustrated in FIG. 17, the depth camera 400 according to embodiments of the present disclosure includes the laser projection unit 100 according to any one of the above-mentioned embodiments, the image acquirer 200, and the processor 300. The image acquirer 200 is configured to acquire the laser pattern projected to the target space after passing through the diffractive optical element 64. The processor 300 is connected to the laser projection unit 100 and the image acquirer 200 separately, and is configured to process the laser pattern so as to obtain the depth image.

Specifically, the laser projection unit 100 projects the laser pattern projected into the target space outward through a projection window 401, and the image acquirer 200 acquires the laser pattern modulated by a target object through an acquisition window 402. The image acquirer 200 may be an infrared camera. The processor 300 calculates an offset value of each pixel point in the laser pattern and a corresponding pixel point in a reference pattern by using an image matching algorithm, and further obtains the depth image of the laser pattern according to the offset value. The image matching algorithm may be a digital image correlation (DIC) algorithm. Certainly, other image matching algorithms can be used instead of the DIC algorithm.

As illustrated in FIG. 18, the electronic device 1000 according to embodiments of the present disclosure includes the housing 500 and the depth camera 400 according to the above-mentioned embodiments. The depth camera 400 is provided in the housing 500 and exposed from the housing 500 so as to obtain the depth image. The electronic device 1000 includes but is not limited to a mobile phone, a tablet computer, a notebook computer, a smart bracelet, a smart watch, a smart helmet, smart glasses, and the like. The housing 500 can provide the depth camera 400 with protection against dust, water, drop, and the like.

Reference throughout this specification to "an embodiment," "some embodiments," "illustrative embodiments," "an example," "a specific example," or "some examples" means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

While the embodiments of the present disclosure have been illustrated and described, it will be understood that the above-described embodiments are illustrative and cannot be construed to limit the present disclosure, changes, alternatives, variation and modifications can be made in the embodiments in the scope of the present disclosure by those skilled in the art, and the scope of the present disclosure is defined by the claims and their equivalents.

What is claimed is:

1. A diffractive optical assembly, comprising:
a sealing assembly comprising a first sealing plate, a second sealing plate and a spacer, the first sealing plate and the second sealing plate being light transparent and arranged opposite to each other, the first sealing plate comprising a first abutment face opposite to the second sealing plate, and the second sealing plate comprising a second abutment face opposite to the first sealing plate, the spacer spacing the first sealing plate and the second sealing plate apart, the first sealing plate, the second sealing plate, and the spacer cooperatively defining a closed receiving cavity; and
a diffractive optical element accommodated in the receiving cavity and comprising a light-transparent diffractive body and a diffractive structure formed on the diffractive body,
wherein at least one of the first abutment face and the second abutment face is formed with a rugged structure engaged with the diffractive structure such that at least one of the first sealing plate and the second sealing plate is in close contact with the diffractive optical element.

2. The diffractive optical assembly according to claim 1, wherein the first sealing plate comprises a first abutment face opposite to the second sealing plate, and the second sealing plate comprises a second abutment face opposite to the first sealing plate;
one diffractive optical element is provided, and the one diffractive optical element abuts against the first abutment face and the second abutment face; or,
at least two diffractive optical elements are provided, and two diffractive optical elements of the at least two diffractive optical elements abut against the first abutment face and the second abutment face correspondingly.

3. The diffractive optical assembly according to claim 2, wherein at least two diffractive optical elements are provided, and two adjacent diffractive optical elements abut against each other; or
two adjacent diffractive optical elements are spaced apart from each other.

4. The diffractive optical assembly according to claim 2, wherein one or at least two diffractive optical elements are provided, the one or at least two diffractive optical elements are spaced apart from the first abutment face and the second abutment face.

5. The diffractive optical assembly according to claim 4, wherein the one diffractive optical element or each of the at least two diffractive elements is mounted to the spacer through a side wall of the diffractive body.

6. The diffractive optical assembly according to claim 1, wherein one diffractive optical element is provided, and the diffractive body comprises a diffraction incident face and a diffraction emission face opposite to each other, and the diffractive structure is formed on the diffraction incident face, or the diffractive structure is formed on the diffraction emission face, or the diffractive structure is formed on the diffraction incident face and the diffraction emission face; or,
at least two diffractive optical elements are provided, the diffractive body of each diffractive optical element comprises the diffraction incident face and the diffraction emission face opposite to each other, and the diffractive structure of each diffractive optical element is formed on the corresponding diffraction incident face, or the diffractive structure of each diffractive optical element is formed on the corresponding diffraction emission face, or the diffractive structure of each diffractive optical element is formed on the corresponding diffraction incident face and diffraction emission face.

7. The diffractive optical assembly according to claim 1, wherein the spacer abuts against the diffractive body.

8. A laser projection unit, comprising:
a substrate assembly;
a lens barrel assembly provided to the substrate assembly and defining an accommodating cavity together with the substrate assembly;
a light source provided to the substrate assembly and received in the accommodating cavity;
a collimating element accommodated in the accommodating cavity; and
a diffractive optical assembly accommodated in the accommodating cavity;
wherein the diffractive optical assembly comprises:

a sealing assembly comprising a first sealing plate, a second sealing plate and a spacer, the first sealing plate and the second sealing plate being light transparent and arranged opposite to each other, the first sealing plate comprising a first abutment face opposite to the second sealing plate, and the second sealing plate comprising a second abutment face opposite to the first sealing plate, the spacer spacing the first sealing plate and the second sealing plate apart, the first sealing plate, the second sealing plate, and the spacer cooperatively defining a closed receiving cavity; and a diffractive optical element accommodated in the receiving cavity and comprising a light-transparent diffractive body and a diffractive structure formed on the diffractive body;

wherein the collimating element, the first sealing plate, the diffractive optical element and the second sealing plate are arranged in an optical path of the light source sequentially, and wherein at least one of the first abutment face and the second abutment face is formed with a rugged structure engaged with the diffractive structure such that at least one of the first sealing plate and the second sealing plate is in close contact with the diffractive optical element.

9. The laser projection unit according to claim 8, wherein the light source is an edge-emitting laser, the light source comprises a light emitting face, and the light emitting face faces the collimating element.

10. The laser projection unit according to claim 9, wherein the light emitting face is perpendicular to a collimating light axis of the collimating element.

11. The laser projection unit according to claim 9, wherein the edge-emitting laser is a distributed feedback laser.

12. The laser projection unit according to claim 8, wherein the light source is a vertical cavity surface emitting laser.

13. The laser projection unit according to claim 8, wherein the lens barrel assembly comprises a lens barrel, the lens barrel comprises a top portion and a bottom portion opposite to each other, the lens barrel defines a through hole running through the top portion and the bottom portion, the bottom portion is supported on the substrate assembly, an annular supporting stage extends from an inner wall of the lens barrel towards a center of the through hole, and the diffractive optical assembly is supported on the supporting stage.

14. The laser projection unit according to claim 13, wherein a side wall of the first sealing plate, a side wall of the second sealing plate, and a side wall of the spacer each are bonded to an inner wall of the top portion in the adhesive method.

15. The laser projection unit according to claim 8, wherein the substrate assembly comprises a circuit board, and the light source and the lens barrel assembly are provided to the circuit board.

16. The laser projection unit according to claim 8, wherein the substrate assembly comprises a substrate and a circuit board supported on the substrate, the circuit board defines a via hole, and the light source is supported on the substrate and accommodated in the via hole.

17. The laser projection unit according to claim 16, wherein the substrate is provided with a heat-dissipation hole.

18. The laser projection unit according to claim 8, wherein the collimating element comprises one or a plurality of lens, and the one or the plurality of lens is provided in the optical path of the light source.

19. The laser projection unit according to claim 18, wherein the lens is made of glass material; or the lens is made of plastic material.

20. A depth camera, comprising:
a laser projection unit comprising:
a substrate assembly;
a lens barrel assembly provided to the substrate assembly and defining an accommodating cavity together with the substrate assembly;
a light source provided to the substrate assembly and received in the accommodating cavity;
a collimating element accommodated in the accommodating cavity; and
a diffractive optical assembly accommodated in the accommodating cavity;
wherein the diffractive optical assembly comprises:
a sealing assembly comprising a first sealing plate, a second sealing plate and a spacer, the first sealing plate and the second sealing plate being light transparent and arranged opposite to each other, the first sealing plate comprising a first abutment face opposite to the second sealing plate, and the second sealing plate comprising a second abutment face opposite to the first sealing plate, the spacer spacing the first sealing plate and the second sealing plate apart, the first sealing plate, the second sealing plate, and the spacer cooperatively defining a closed receiving cavity; and
a diffractive optical element accommodated in the receiving cavity and comprising a light-transparent diffractive body and a diffractive structure formed on the diffractive body;
wherein the collimating element, the first sealing plate, the diffractive optical element and the second sealing plate are arranged in an optical path of the light source sequentially, and
wherein at least one of the first abutment face and the second abutment face is formed with a rugged structure engaged with the diffractive structure such that at least one of the first sealing plate and the second sealing plate is in close contact with the diffractive optical element;
an image acquirer configured to acquire a laser pattern projected to a target space after passing through the diffractive optical element; and
a processor connected to the laser projection unit and the image acquirer separately and configured to process the laser pattern so as to obtain a depth image.

* * * * *